Aug. 1, 1961  G. T. CLAWSON  2,994,526
UNIVERSAL WORK HOLDER

Filed March 11, 1960  3 Sheets-Sheet 2

INVENTOR.
GEORGE T. CLAWSON
BY
ATTORNEYS

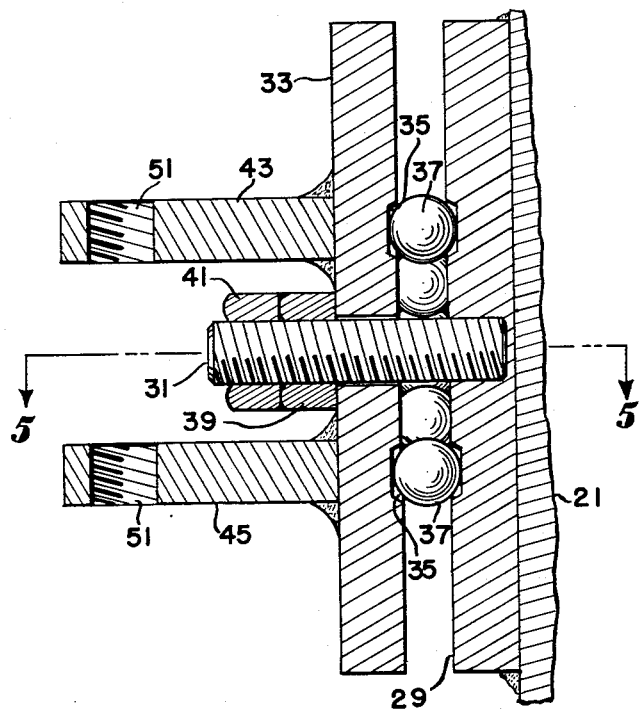
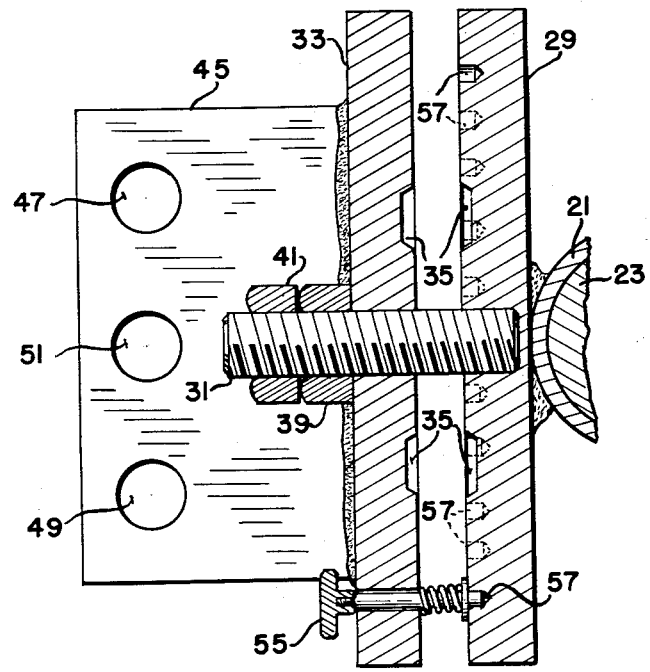

United States Patent Office 2,994,526
Patented Aug. 1, 1961

2,994,526
UNIVERSAL WORK HOLDER
George T. Clawson, Westerville, N.Y., assignor to the United States of America as represented by the Secretary of the Air Force
Filed Mar. 11, 1960, Ser. No. 14,487
3 Claims. (Cl. 269—191)
(Granted under Title 35, U.S. Code (1952), sec. 266)

The invention described herein may be manufactured and used by or for the United States Government for government purposes without payment to me of any royalty thereon.

This invention related to work holding apparatus in general and more particularly is concerned with providing means for facilitating the handling of work pieces such as heavy electronic equipment during assembly, service and repair in a position which makes readily accessible the many small and delicate parts used in their manufacture.

It is well known that many of the parts of presently used heavy electronic equipment such as oscilloscopes are inaccessible for assembly, inspection and repair in the normal position of the chassis. Also, it is obvious that in positioning heavy equipment so as to make these parts accessible, there is a danger of jarring, shock and mechanical stresses inadvertently being applied to the delicate components causing considerable damage which could, in turn, result in dangerous unreliability of the equipment.

Accordingly, it is an object of the present invention to provide a work holder which is capable of supporting a relatively heavy workpiece in a number of diverse positions to facilitate operations thereon.

Another object of the invention is to make accessible for assembly, service, or calibration the normally inaccessible parts which constitute an oscilloscope or other similar heavy electronic equipment.

Still another object of the present invention is to provide a means for facilitating the handling of heavy electronic equipment by eliminating the danger of mechanical damage to its components.

A further object of the invention is to provide a work holder by means of which a single technician is capable of safely handling a large oscilloscope while making test readings and adjustments.

Another object of the invention is to provide a work holder by means of which a single technician is capable of safely handling a large oscilloscope while making test readings and adjustments.

Another object of the invention is to provide a work holding device which allows the technician or mechanic to balance any workpiece by providing both vertical and horizontal adjusting means for matching the center of gravity of various workpieces.

The above and other objects, features and advantages will become more apparent from the following description taken in conjunction with the accompanying drawings wherein:

FIGURE 4 is a view in section of the gimbal and rack support plates; and

FIGURE 5 is a view along the line 5—5 of FIG. 4 with the lock pin shown in detail.

Figure 1:
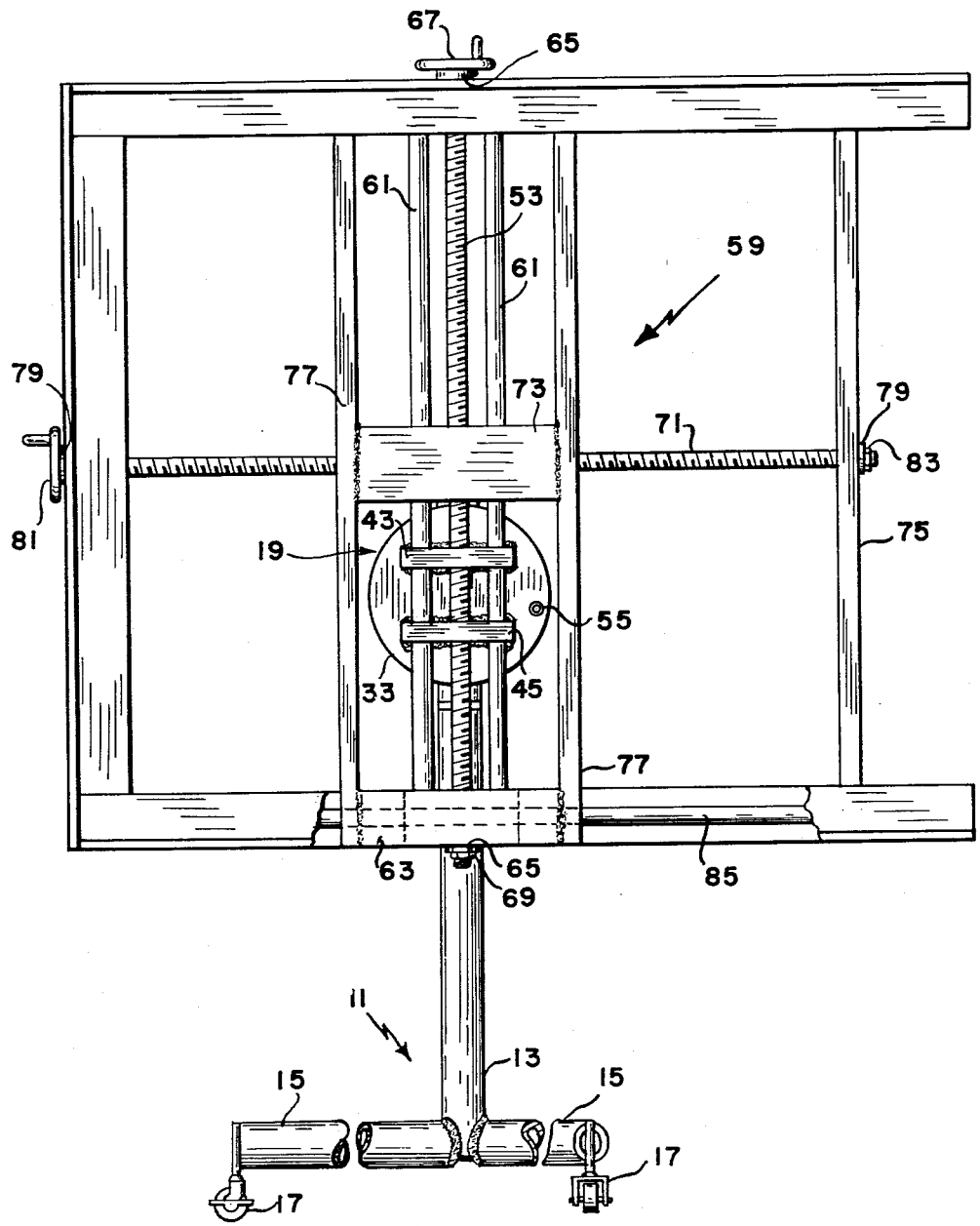
FIGURE 1 is a view front elevation of the universal work holder including the rack and balance unit, pillar, and pedestal.
Figure 2:
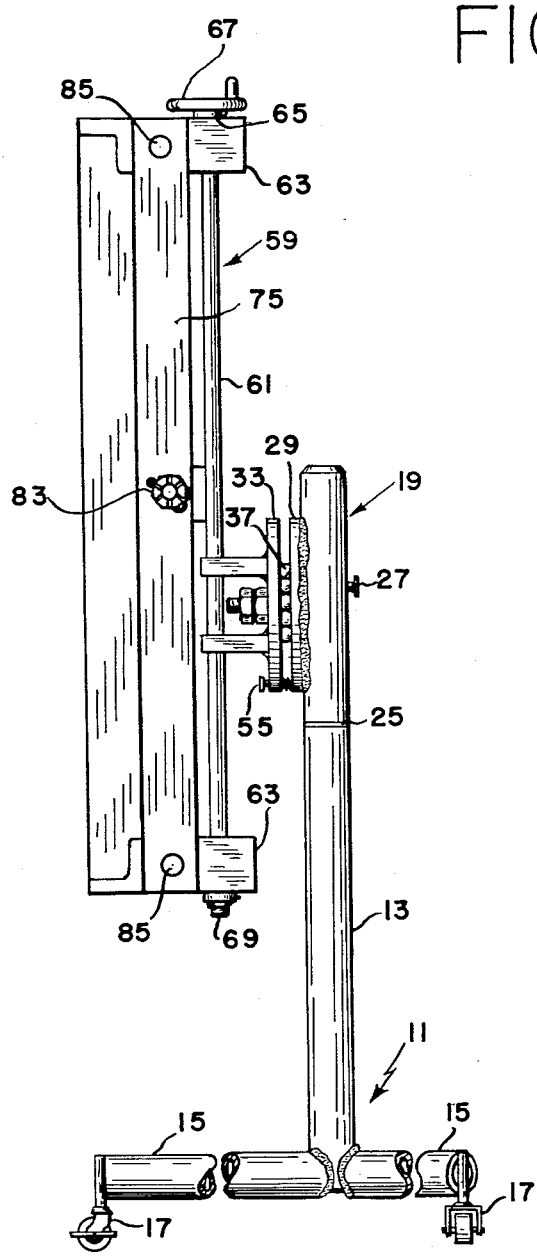
FIGURE 2 is a view in side elevation of the work holder showing the universal gimbal arrangement attached to the upper portion of the pillar.

Referring to the drawings in which like reference characters are used to refer to like parts throughout the specification, the invention includes a pedestal 11 comprising a vertical pillar 13 which may be fabricated from a hollow cylindrical member. There are attached to the lower end of the pillar 13 three horizontally disposed legs 15 which serve to support and maintain the pillar in an upright position. These legs 15 are preferably attached to the pillar 13 by welding and include a locking-type caster 17 at the outer extremity of each leg.

Figure 3:
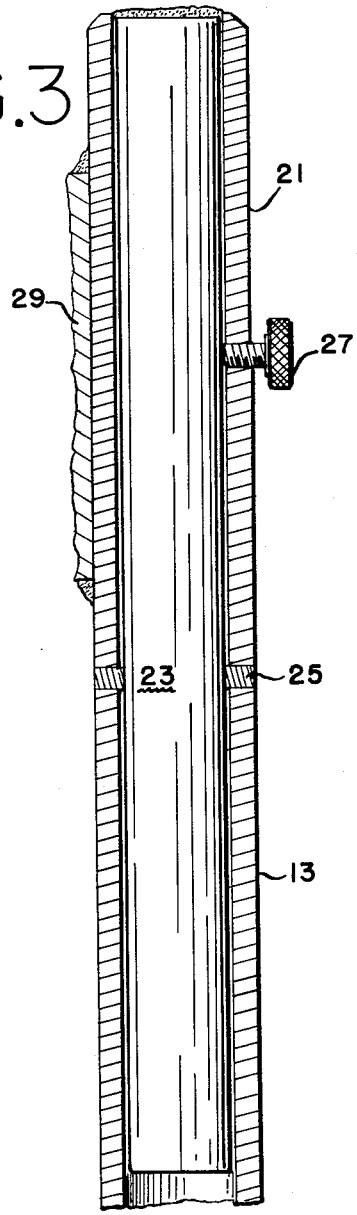
FIGURE 3 is a sectional view of the upper vertical pillar.

A gimbal head generally designated by the reference numeral 19 is located at the upper portion of the pillar 13 and is supported thereby. The gimbal head 19 is fabricated from an elongated hollow cylindrically shaped member 21 of similar diametrical measurements as the pillar 13. A shaft 23 somewhat longer than member 21 and slightly smaller in diameter is inserted therethrough and secured to it, preferably by welding flush at their respective upper ends. This necessarily results in the shaft 23 freely extending beyond the lower end of member 21. A thrust bushing 25 is slipped over the shaft 23 and the free end of the shaft then inserted into the open end of the pillar 13, lowering therein until the bushing 25 is in contact with the upper end faces of the pillar 13 and the lower end face of the member 21. This assembly arrangement, shown most clearly in FIG. 3, allows the gimbal head 19 to rotate in the azimuth direction relative to the pedestal 11. A lock screw 27 is provided to prevent relative rotational movement and retain the elements in a fixed position.

There is attached, preferably by welding, to the side of member 21 a flat, circular disc 29 which has extending therefrom a threaded stud 31. A matching disc 33, having an opening for receiving stud 31 machined in the center thereof, is placed in spaced alignment with said disc 29. A pair of corresponding circular grooves 35 are machined in the adjacent inner faces of the spaced discs 29 and 33 serving as bearing races for a series of balls 37 which are placed therein. A tightening nut 39 and a locking nut 41 are placed over the stud 31 serving to hold the discs 29 and 33 with the balls 37 therebetween in position. The arrangement thus described forms a vertically disposed thrust bearing.

The outer disc 33 of the thrust bearing has attached to its outer surface a pair of plates 43 and 45 extending outwardly therefrom. Each of these plates 43 and 45 has machined therein two smooth walled openings 47 and 49 in line with and spaced from each other. Between these openings there is machined a threaded opening 51 adapted to receive a vertical balance screw 53 to be described below. Also attached to the outer disc 33 is an indexing pin 55 which extends into the indentations 57 on the surface of the inner disc 29. Spring biasing means are provided for maintaining the end of said pin in the proper indentation, thereby preventing rotation of the gimbal head 19 while an operation is performed on the workpiece.

The rack generally designated by the numeral 59 includes the aforementioned vertical balance screws 53 threaded through openings in the plates 43 and 45 and serving to determine the vertical position of the rack 59 in relation to the pedestal 11. A pair of guide rods 61 which pass through the smooth walled openings 47 and 49 of the plates 43 and 45 serve to control the vertical motion of rack unit 59. Both the balance screw 53 and the guide rods 61 terminate at the sliding supports 63 which are located at the top and bottom of the rack 59. The guide rods 61 are fixedly attached to the sliding supports 63 by means of set screws (not shown) while the vertical balance screw 53 is adapted to pass through and turn freely within the supports 63. Thrust washers 65 are provided at each end of the balance screws 53 and a handle 67 is fixedly attached to the upper end. A nut and cotter pin 69 are fixed on the lower end of the balance screw 53 after it passes through the rack framework.

A similar arrangement is provided for manipulating the rack 59 in the horizontal direction. The horizontal balancing screw 71 passes through the horizontal threaded block 73 and the side frame member 75. A pair of cross members 77 serve to support and retain the block 73 and the sliding supports 63 in position. Thrust washers 79 are provided at both ends of the horizontal screw 71, with a handle 81 fixed to one end and a nut and cotter pin 83 on the other end. A pair of guide rods 85 operate in the manner of the guide rods 61 to control and direct the movement of the rack 59 in the horizontal direction.

In operation, the device expedites the handling, repair, alignment and calibration of bulky electronic equipment such as oscilloscopes. The scope to be serviced is placed on the edge of a bench. A small part of the chassis is allowed to overhang the bench top. The workholder is brought into contact with the chassis and the two units are clamped together. The workholder, with the scope held thereon, is then wheeled away from the bench, leaving 5 open sides which allow substantially complete accessability to all of the oscilloscope parts. If necessary, the rack 59 may be adjusted by rotating the handles 67 and 81 in order to balance the equipment so that it can be easily rotated.

It will be noted that the invention herein disclosed is particularly helpful in the alignment, repair and transport of heavy electronic equipment. Where it formerly required at least two men to safely handle a heavy oscilloscope during servicing, it can now be accomplished more easily and safely by a single operating technician. To further add to the utility of the invention, provisions may be made for the installation of a mount on the side of the gimbal head 19 to hold in a convenient location a vacuum tube voltmeter or multitester.

Although only a single embodiment of the invention has been described and shown in detail, it is to be understood that the invention is not so limited. Many changes, particularly in the details of construction, can be made therein without departing from the true spirit and scope of the appended claims. For example, the gimbal head 19 could be replaced by a ball and socket or other type arrangement which would allow more or less universal movement of the mounted chassis.

What I claim is:

1. Work holding apparatus for rotatably mounting a workpiece thereon, said apparatus comprising a base having a plurality of outwardly extending supporting members, an upright pillar attached to said base, said pillar including a rotatable upper portion forming a gimbal head, said gimbal head including a first disc fixedly attached to the side of the upper portion of said pillar, a threaded stud extending outwardly from the center of said first disc, a second disc having an opening in the center thereof for receiving said stud therethrough, said first and second discs being in spaced relation to each other, a circular groove formed in each of the adjacent faces of said discs, a series of balls disposed between said discs in said grooves, fastening means on said threaded stud for retaining said second disc in position, a pair of spaced plates in parallel relation to each other extending outwardly from the outer face of said second disc, said plates being provided with a plurality of aligned openings, a rack unit for supporting a workpiece thereon, said rack including a threaded vertical balancing screw passing through one of the openings in each of said parallel spaced plates, a first pair of guide rods in parallel spaced relation to said vertical balance screw and passing through other openings in each of said spaced plates, said vertical balancing screw operating to adjust the vertical position of said rack unit, a horizontal balancing screw for adjusting the horizontal position of said rack unit, a second pair of guide rods fixed to horizontal members on said rack, and a pair of sliding supports through which said second guide rods are slidably disposed, said second guide rods being parallel to and on either side of said horizontal balance screw, the relative positions of said vertical and horizontal balancing screws determining the position of the rack unit with supported workpiece.

2. The work holding apparatus described in claim 1 wherein indexing means are included for locking said rack unit in a particular angular position, said index means comprising an indexing pin slidably affixed to and passing through said second disc, a series of indentations on the inner face of said first disc, and biasing means to retain one end of said indexing pin in one of said indentations.

3. A work holder for rotatably mounting a workpiece comprising a base, an upright pillar attached to and supported said base, a rotatable gimbal head mounted on the upper end of said pillar, said gimbal head including thrust bearing means for rotation in a plane perpendicular to the longitudinal axis of said pillar, a rack attached to said thrust bearing means and adapted to rotate therewith, and adjusting means for positioning the center of gravity of the workpiece in line with the center of rotation of said thrust bearing means, said adjusting means including vertical balance screw for moving said rack in the vertical direction, a first pair of guide rods passing through vertically aligned openings in said gimbal head, said first guide rods being parallel and on either side of said vertical balance screw, a horizontal balance screw for moving said rack in the horizontal direction, a second pair of guide rods fixed to horizontal members on said rack, and a pair of sliding supports through which said second guide rods are slidably disposed, said second guide rods being parallel to and on either side of said horizontal balance screw.

References Cited in the file of this patent

UNITED STATES PATENTS

| | | |
|---|---|---|
| 1,397,931 | Kurtz | Nov. 22, 1921 |
| 2,582,011 | Cunningham | Jan. 8, 1952 |
| 2,654,147 | Wilson et al. | Oct. 6, 1953 |
| 2,781,930 | Menser et al. | Feb. 19, 1957 |

FOREIGN PATENTS

| | | |
|---|---|---|
| 324,780 | Germany | Sept. 2, 1919 |